Jan. 19, 1926.  1,569,922
E. GRANAT
ELECTRIC CONTROL SYSTEM FOR ALL MOVABLE ELEMENTS OPERATING BY A
VERY SMALL POWER, AND CHIEFLY FOR THE GYROSCOPIC COMPASS
Filed May 14, 1924   2 Sheets-Sheet 1

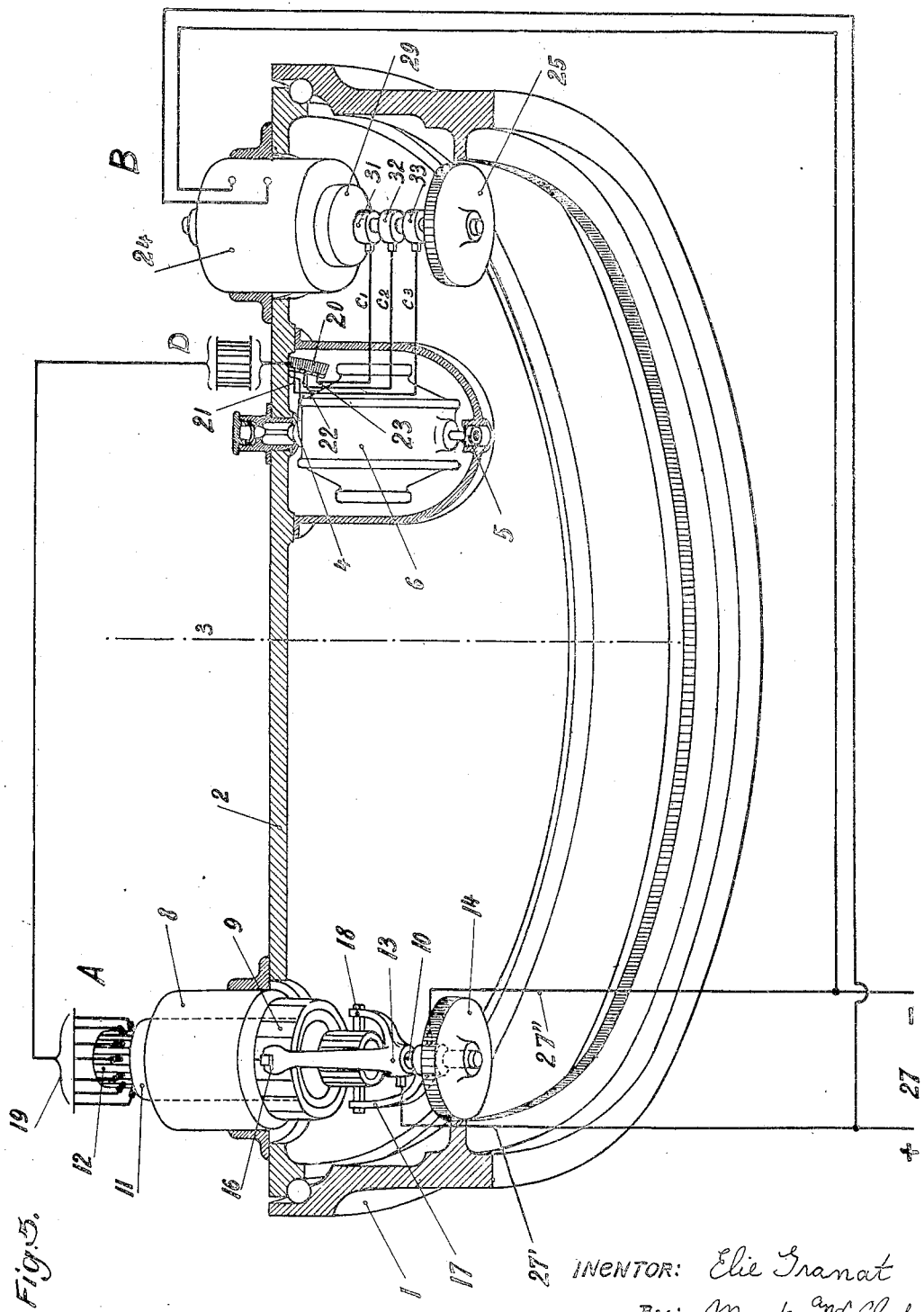

Patented Jan. 19, 1926.

UNITED STATES PATENT OFFICE.

ELIE GRANAT, OF PARIS, FRANCE, ASSIGNOR OF ONE-HALF TO COMPAGNIE DES FORGES ET ACIÉRIES DE LA MARINE ET D'HOMÉCOURT, OF PARIS, FRANCE, A FRENCH CORPORATION.

ELECTRIC CONTROL SYSTEM FOR ALL MOVABLE ELEMENTS OPERATING BY A VERY SMALL POWER, AND CHIEFLY FOR THE GYROSCOPIC COMPASS.

Application filed May 14, 1924. Serial No. 713,307.

*To all whom it may concern:*

Be it known that I, ELIE GRANAT, a citizen of the French Republic, residing at 10 Rue Caumartin, Paris, France, have invented certain new and useful Improvements in electric control systems for all movable elements operating by a very small power, and chiefly for the gyroscopic compass, of which the following is a specification.

My invention relates to an electric control system in which the control is effected by a movable element actuated by a force which is insufficient to carry out any other operation—without prejudice to its normal movements—than that of making electric contacts between the brushes mounted thereon and fixed contact pieces co-operating with the said brushes. The arrangement herein considered is chiefly one employed with the gyroscopic compass on board vessels, where the said compass serves to control various elements such as repeating compass cards, and like devices.

When a considerable power is required to operate the receiving elements, and when the latter are numerous, it becomes necessary to employ a controlling relay device in order to avoid the use of heavy currents in the contacts of the transmitter—which would require heavy brushes with an excessive contact pressure, thus precluding the operation of the same by the movable element actuated by a very small force and serving for the control of the receivers. Otherwise stated, the controlling element actuates a relay-receiver which is frequently termed a " phantom element " (since it is placed next the controlling element and follows all its movements), and the said relay, which may dispose of a greater power for operating a second transmitter, serves to control the receiving apparatus of the system. In this event it will often prove advantageous, and chiefly for the gyroscopic compass, to dispose the initial controlling element, i. e., the gyroscopic compass, upon the phantom disc which it controls through the medium of various devices to be hereinafter described and which are responsive to all changes in direction of the said controlling element.

The said devices are in fact suitable applications of my electric distant control system described in the following French patents: Patent No. 540,353 of the 14th of January, 1921; Patent No. 557,977 dated the 8th of February, 1922, entitled: Electric distant control system; Patent No. 578,361 dated the 18th of May, 1923, entitled: Electric control system in which the receiving element is placed in a certain number of predetermined positions.

In the present invention the phantom disc carrying the gyroscopic compass also carries the transmitter and receiver of a control system of the type described in my above mentioned French Patent No. 578,361. It should be observed that the arrangements as disclosed in the said patent are as follows. The transmitter is an electric machine (dynamo or motor) whose armature is provided with a commutator and is supplied with continuous current; co-operating with the said commutator are mounted in the fixed position suitable brushes which are thus brought in each case to a definite and constant potential. The said transmitter is connected with a distributer which is composed of a circular set of contact segments, each segment being connected to a corresponding fixed brush of the transmitter and thus brought to the same potential as the brushes, respectively. A movable brush-holder with a set of brushes co-operates with the said circular set of contact segments, three brushes being used for example, and when moved upon the several segments the brushes will take off a series of combinations of three potentials wherein each combination represents the three potentials which would be given to the three movable brushes if they were mounted in a like position upon the commutator of the transmitter armature. The three brushes of the distributer are connected respectively with the three vertices of the three-phase winding of the receiver, which latter consists of a synchronous motor. If the three brushes were moved upon the commutator of the transmitter armature, the receiver would be supplied with polyphase current and it would follow the movement of the set of movable brushes in a continuous manner. But if the said movable brushes operate upon the circular set of segments of the distributer, their potentials will vary in a discontinuous manner, and each combination of three potentials taken up by the brushes will correspond to a given position of the receiver, which latter will thus be controlled by continuous displacements by the movement of the set of movable brushes of the distributer.

In my invention, a transmitter and a receiver of this type, as well as the gyroscope, are mounted upon the said phantom disc. Upon an arm of the gyroscope are mounted the three movable brushes of the distributer which co-operate with a set of segments disposed along a portion of a circle and connected with the fixed brushes of the transmitter. The movable part of the receiver, which is mounted on the edge of the phantom disc, is provided with a pinion engaging a stationary toothed ring surrounding the said disc. Any change in the position of the said disc with reference to the gyroscope mounted thereon, is manifested by a displacement of its three contacts upon the set of segments, and by a corresponding rotation of the rotor of the receiver, the pinion of said rotor engaging the said toothed ring will effect the rotation of the phantom disc through the same angle as the gyroscope. Due to this rotation of the disc, the gyroscope brushes are brought upon the segments of concordance upon which they were located before the relative movement in question was effected; but the said segments have potentials which correspond to the original position of the rotor of the receiver relative to its stator, and by no means to its new position; so that if the operation described is to take place, it is necessary, according as the receiver rotor turns and thus rotates the phantom disc—bringing the gyroscope brushes back to the three segments of concordance—that the said segments should be supplied by the successive combinations of potentials corresponding to the successive positions assumed by the receiver rotor with reference to its stator. For this purpose it will suffice to vary in a corresponding manner upon the transmitter commutator the origins of the potentials by displacing the brushes applying the same with continuous current; this result can be had by mounting the said brushes upon a brush-holder provided with a pinion engaging the fixed toothed ring surrounding the phantom disc, so that the rotation of the said disc will effect the rotation of the brush-holder and its brushes supplying the transmitter armature. In order that the distribution of potential on the transmitter commutator shall remain unchanged by the rotation of the said brush-holder, the field flux must rotate concurrently through the same angle, and to this end the field circuit consists of a closed winding provided with a commutator and supplied with continuous current at two opposite points by two brushes mechanically connected with the armature brushes and at 90° therefrom.

The following description, together with the appended drawings which are given by way of example, relates to an embodiment of the invention wherein a gyroscopic compass controls the phantom disc upon which the compass is mounted.

Fig. 3 is a partly sectional side view of the device.

Figure 1:
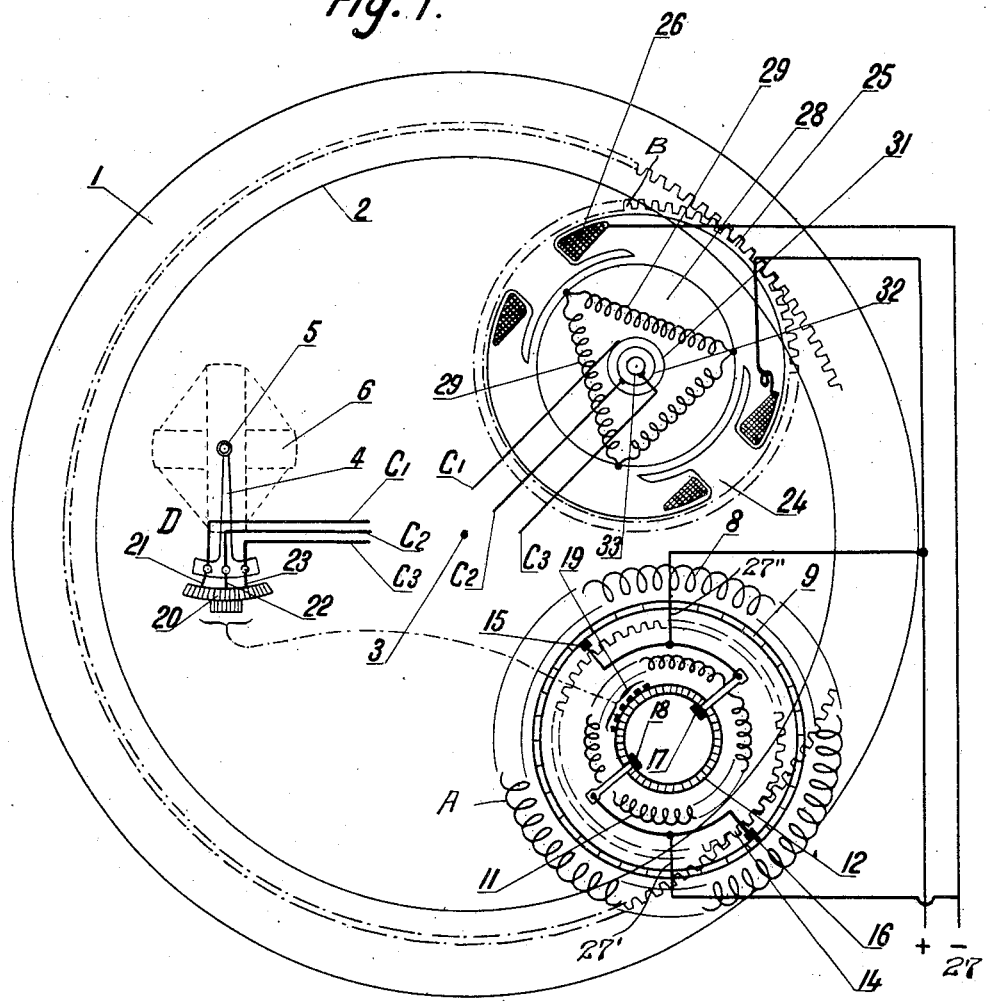
Fig. 1 is a general diagram of the device.
Figure 2:
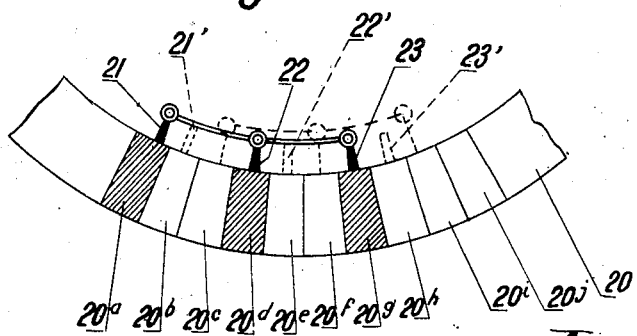
Fig. 2 shows a portion of the distributer on a larger scale.

The gyroscope 6 is pivoted upon a vertical shaft 5 mounted on the phantom disc 2 which is revoluble on the vertical shaft 3; the gyroscope is provided with an arm 4 which serves as the controlling element. To the disc 2 is secured a transmitter which will be designated as a whole by A; it comprises a stationary field consisting of a short-circuited winding 8 whose different sections are connected to a commutator 9; the movable armature has in like manner a short-circuited winding 11 connected to a commutator 12. On the transmitter shaft 10 is loosely mounted a movable device 13 secured to the pinion 14 which engages the toothed portion of the ring 1; said device carries two pairs of oppositely-disposed brushes in the 90° position, one set 15—16 coacting with the commutator of the field and the other set 17—18 with the commutator of the armature; the brushes 15, 16, 17, 18 are supplied from a source of continuous current 27 by connections shown diagrammatically in 27', 27''.

Upon the armature commutator are disposed a set of stationary brushes at equal distances apart 19—only a few being shown—and each brush is connected to one of the insulated segments 20 of the distributer, this latter element being designated as D. The segments which are disposed along a portion of a circle co-operate with the three movable brushes 21, 22, 23 which are mounted upon the gyroscope arm 4. The three corresponding wires $C_1$ $C_2$ $C_3$ are connected to the receiver (designated as B), which is constituted by a synchronous motor whose field 24 forming the rotor, the bearings of which are not shown, is secured to a pinion 25 engaging the stationary toothed ring 1; the said field is provided with the windings 26 supplied by the source of continuous current 27. The stator 28 has a three-phase winding 29 whereof the vertices are connected to the rings 31, 32, 33 coacting with the brushes of the conductors $C_1$ $C_2$ $C_3$, respectively.

The operation is as follows:

When current from the source 27 is sent into the brushes 15, 16, 17, 18 of the transmitter A, its armature will be set in motion since the fluxes of the field and armature are perpendicular to each other; the rotation of the transmitter armature will set up in each of the stationary brushes 19 a potential having a well-defined and constant value, so that each of the segments of the series 20 will have a well-determined potential. The device comprises a set of segments $20^a$ $20^b$ ... $20^j$ having the respective potentials $a\ b\ c\ ...\ j$. The brushes 21, 22, 23 mounted on the arm 4 of the gyroscope and connected with the line wires $C_1\ C_2\ C_3$ are disposed, at the instant taken at the initial point, for example upon the segments $20^a$ $20^d$ $20^g$; it is supposed that these segments are the ones corresponding to concordant positions of the gyroscope and the phantom disc, and hence they will be designated as "segments of concordance"; these segments $20^a\ 20^d\ 20^g$ take off the potentials $a, d, g$, respectively, imparting the same to the three phase winding 29 of the receiver B, in which they produce three fluxes whose resultant has a position depending upon the three potentials. The rotor 24 of the receiver thus occupies a given position in which this resultant is equal and contrary to the uniform flux of the field poles.

Let it be supposed that the arm 4 moves over the segments—e. g., due to a change in position of the vessel—and that the brushes 21, 22, 23 have the immediately following positions $21^1\ 22^1\ 23^1$ upon the segments $20^b$ $20^e$ $20^h$; the potentials imparted to the receiver will be $b, e, h$. To these potentials will correspond a single position of the rotor of the receiver; so that the said rotor will turn into this position of equilibrium and thus through an angle corresponding to the angle of rotation of the gyroscope arm 4, drawing with it the movable disc 2 by reason of the gear engagement of the pinion 25 with the toothed ring 1. This rotation of the disc will cause the displacement of the set of segments 20 with reference to the arm 4 of the gyroscopic compass, so that the brushes 21, 22, 23 will return to the respective "segments of concordance" $20^a\ 20^d\ 20^g$; but supposing that these segments still had at this moment the initial potentials $a, d, g$, the rotor of the receiver would set up a rotation (in the opposite direction) through the same angle, and hence it would be impossible to operate the device; the segments $20^a\ 20^d\ 20^g$ must therefore assume the respective potentials $b, e, h$. This result is obtained inasmuch as the rotation of the disc, by actuating the movable set 13 of the transmitter A by means of the pinion 14, has displaced the movable brushes 17 and 18 on the commutator of the transmitter armature. The distribution of potential in the fixed brushes 19, and hence in the segments 20, has accordingly changed as to its origin, being modified in a manner corresponding to the rotation of the receiver, i. e., so that the segments of concordance will now receive the potentials $b, e, h$ corresponding to the new position of the rotor of the receiver B relative to its stator.

It should be noted that the rotation of the movable set 13 has no effect upon the conditions of motion of the armature of the transmitter A nor upon the distribution of potentials (except for the change in the origin as mentioned) upon the commutator of the said armature, because the movable set will draw with it the brushes 15 and 16 of the field as well as the brushes 17 and 18 of the armature, so that the field and armature fluxes will still remain at right angles.

What I claim is:

1. In an arrangement for electrically controlling a revoluble device through a revoluble element pivotally mounted on said device, the combination of a transmitting electric machine borne by the controlled device and comprising a field magnet and an armature, means for feeding field magnet and armature with direct current, a commutator on armature, $m$ equidistant brushes mounted on the controlled revoluble device and disposed round commutator, a distributor comprising $m$ contact segments disposed on the controlled revoluble device on a portion of a circle surrounding the controlling revoluble element, wires connecting the $m$ equidistant brushes of the commutator of the armature respectively with the $m$ corresponding contact segments, a brush holder mounted on the revoluble controlling element, $n$ brushes held by said brush holder and adapted to move along contact segments of distributor, a receiver consisting of a synchronous motor, stator of the receiver being provided with a polyphase winding of $n$ phases rotor of the receiver being fed by direct current, wires connecting each of the $n$ vertices of the polyphase winding with the corresponding brush on revoluble controlling element, means whereby rotation of the rotor causes the rotation of the revoluble controlled device, means whereby the potentials of the $n$ segments of the distributor which are in contact with the $n$ brushes mounted on the controlling element when latter and the controlled device are in concordance produce at each moment in rotor of receiver a field in equilibrium with the field produced in stator at the same time.

2. In an arrangement for electrically controlling a revoluble phantom disc through a gyroscope pivotally mounted thereon, the combination of a transmitting electric machine borne by the phantom disc and comprising a field magnet and an armature, a commutator on the field magnet, a commutator on the armature, two sets of brushes revolubly each on one commutator, a holder holding the two sets 90° apart, a pinion to which holder is secured, means whereby both sets are fed with direct current, $m$ equidistant brushes mounted on the phantom disc and disposed round the commutator of the armature, a distributor comprising $m$ contact segments disposed on the phantom disc on a portion of a circle surrounding the gyroscope, wires connecting respectively the $m$ equidistant brushes of the commutator of the armature respectively with the $m$ corresponding contact segments, a brush holder mounted on gyroscope, $n$ brushes held by said brush holder and adapted to move along contact segments of distributor, a receiver consisting of a synchronous motor mounted on the phantom disc, the stator of the receiver being provided with a polyphase winding of $n$ phases, the rotor of the receiver being fed by direct current, wires connecting each of the $n$ vertices of the polyphase winding with the corresponding brush of the gyroscope, a driving pinion secured to rotor of the receiver, a stationary toothed ring surrounding the phantom disc engaging said pinion of the receiver and the pinion to which the brush holder of the transmitting device is secured.

ELIE GRANAT.